United States Patent
Park et al.

(10) Patent No.: US 11,765,016 B2
(45) Date of Patent: Sep. 19, 2023

(54) DIAGNOSTIC SYSTEM AND VEHICLE

(71) Applicants: Hyundai Motor Company, Seoul (KR); Kia Motors Corporation, Seoul (KR)

(72) Inventors: Pilyong Park, Seoul (KR); Seong Jin Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 282 days.

(21) Appl. No.: 17/089,397

(22) Filed: Nov. 4, 2020

(65) Prior Publication Data

US 2021/0306204 A1 Sep. 30, 2021

(30) Foreign Application Priority Data

Mar. 26, 2020 (KR) ........................ 10-2020-0036792

(51) Int. Cl.
| | |
|---|---|
| H04L 41/0654 | (2022.01) |
| H04L 43/065 | (2022.01) |
| H04L 12/40 | (2006.01) |
| H04L 67/51 | (2022.01) |
| B60R 16/023 | (2006.01) |
| B60W 50/02 | (2012.01) |
| H04L 67/12 | (2022.01) |

(52) U.S. Cl.
CPC ........ *H04L 41/0654* (2013.01); *B60R 16/023* (2013.01); *B60W 50/0205* (2013.01); *H04L 12/40* (2013.01); *H04L 12/40013* (2013.01); *H04L 43/065* (2013.01); *H04L 67/12* (2013.01); *H04L 67/51* (2022.05); *B60W 2050/021* (2013.01); *H04L 2012/40215* (2013.01)

(58) Field of Classification Search
CPC ................ H04L 41/0654; H04L 12/40; H04L 12/40013; H04L 43/065; H04L 67/51; H04L 67/12; H04L 49/351
See application file for complete search history.

(56) References Cited

U.S. PATENT DOCUMENTS

| | | | |
|---|---|---|---|
| 2009/0052336 A1* | 2/2009 | Nguyen | G06F 1/206 370/245 |
| 2011/0131269 A1* | 6/2011 | Gilleland | G06Q 10/063114 709/224 |
| 2014/0040434 A1* | 2/2014 | Rybak | G07C 5/008 709/219 |
| 2016/0142303 A1* | 5/2016 | Kim | H04L 45/66 370/401 |
| 2018/0091597 A1* | 3/2018 | Kim | G07C 5/0808 |

(Continued)

*Primary Examiner* — Redentor Pasia
(74) *Attorney, Agent, or Firm* — Fox Rothschild LLP

(57) ABSTRACT

A vehicle is provided that includes Ethernet controllers that operate first electronic devices and perform communication using scalable service-oriented middleware on Ethernet/internet protocol (SOME/IP). An Ethernet switch generates a communication path between the Ethernet controllers and executes communication between the Ethernet controllers based on the generated path. A plurality of CAN controllers operate second electronic devices and perform CAN communication. A gateway then executes the CAN communication with the CAN controllers, executes communication with the Ethernet switch, and transmits CAN diagnostic information of the CAN controller to the Ethernet switch.

8 Claims, 9 Drawing Sheets

(56) References Cited

U.S. PATENT DOCUMENTS

| | | | | |
|---|---|---|---|---|
| 2018/0239668 A1* | 8/2018 | Shu | .................... | G06F 11/0751 |
| 2018/0293811 A1* | 10/2018 | Liu | ...................... | G07C 5/0808 |
| 2018/0352040 A1* | 12/2018 | Bartsch | .................. | H04L 67/51 |
| 2018/0352512 A1* | 12/2018 | Kim | ........................ | H04L 67/12 |
| 2019/0239221 A1* | 8/2019 | Ujiie | ....................... | H04L 12/28 |
| 2019/0268420 A1* | 8/2019 | Acharya | ............. | H04L 63/0823 |
| 2019/0394089 A1* | 12/2019 | Barrett | ................ | H04W 12/088 |
| 2020/0269782 A1* | 8/2020 | Fujihira | ................. | H05K 7/026 |
| 2020/0342099 A1* | 10/2020 | Kerstein | ................. | H04L 12/40 |
| 2021/0014340 A1* | 1/2021 | Weber | .................... | H04L 45/74 |
| 2021/0176090 A1* | 6/2021 | Yamamoto | ............ | B60R 16/023 |
| 2021/0229598 A1* | 7/2021 | Morimura | ................ | B60Q 1/52 |
| 2021/0266244 A1* | 8/2021 | Haga | .................. | H04L 43/0894 |
| 2021/0281595 A1* | 9/2021 | Hirano | .................... | H04W 4/48 |
| 2021/0399916 A1* | 12/2021 | Rox | ........................ | H04L 69/08 |
| 2022/0122382 A1* | 4/2022 | Mattern | ............... | G07C 5/0808 |
| 2022/0242419 A1* | 8/2022 | Davidovich | ......... | G08B 29/188 |

\* cited by examiner

| No. | ITEM | CONTENTS |
|---|---|---|
| 1 | Service ID | DIAGNOSIS Request ID |
| 2 | Method ID/Event ID | WHEN APPLYING DIAGNOSTICS, APPLY WITH METHOD ID |
| 3 | Client ID/Session ID | WHEN APPLYING EVENT Client/Session ID ALL 0x00 |
| 4 | Message Type | MESSAGE TYPE SETTING ACCORDING TO DIRECTION (DIAGNOSIS REQUEST/RESPONSE CLASSIFICATION) [0x02] service provider sends, [0x00] service provider receives |

DIAGNOSTIC SYSTEM AND VEHICLE

CROSS-REFERENCE TO RELATED APPLICATION(S)

This application is based on and claims priority under 35 U.S.C. § 119 to Korean Patent Application No. 10-2020-0036792, filed on Mar. 26, 2020, the disclosure of which is incorporated by reference in its entirety.

TECHNICAL FIELD

The disclosure relates to a diagnostic system and a vehicle for diagnosing communication errors.

BACKGROUND

Vehicles may perform basic driving functions and additional functions for user convenience, such as an audio function, a video function, a navigation function, an air-conditioning control function, a seat heating function, a communication function with an external terminal, and the like. As electronic control devices and multimedia devices in the vehicles increase, a large amount of cables and connectors are required to interconnect separation devices. This is a significant part of an overall weight and manufacturing cost of the vehicle, leading to reduced reliability and increased quality issues. In addition, as the electronic control devices and the multimedia devices in the vehicle are diversified, there is a problem in that diagnostic specifications of a controller for controlling various devices are changed, or a diagnostic device for diagnosing a malfunction is to be changed.

SUMMARY

An aspect of the disclosure is to provide a diagnostic system and a vehicle for easier diagnosis between a client and a server using scalable service-oriented middleware on Ethernet/internet protocol (SOME/IP) service discovery (SD) and Internet Group Management Protocol (IGMP). Additional aspects of the disclosure will be set forth in part in the description which follows and, in part, will be obvious from the description, or may be learned by practice of the disclosure.

In accordance with an aspect of the disclosure, a diagnostic system may include an Ethernet controller configured to execute operation of at least one load, and to perform communication with the at least one load using scalable service-oriented middleware on Ethernet/internet protocol (SOME/IP); an Ethernet diagnostic device configured to perform communication with the Ethernet controller using the SOMP/IP, and to diagnose failures of the Ethernet controller and the at least one load; and an Ethernet switch configured to generate a path between the Ethernet controller and the Ethernet diagnostic device, and to transmit and receive messages between the Ethernet controller and the Ethernet diagnostic device based on the generated path.

A message format of the SOME/IP may include a payload configured to transmit and receive diagnostic request data and response data for diagnosing the failure, and to a SOME/IP header having identification information for diagnosing the failure, a transport protocol, and an IP header. The SOME/IP header may include service identification information ID, Method identification information ID, client identification information ID, session identification information ID, and a message type.

The Ethernet controller and the Ethernet diagnostic device may be configured to perform communication via a SOME/IP service discovery (SD) area to discover for a service or provide the service. The Ethernet switch may be configured to register or remove the Ethernet controller and the Ethernet diagnostic device from a member list by communicating with the Ethernet controller and the Ethernet diagnostic device via an Internet group management protocol (IGMP). The Ethernet switch may be configured to periodically transmit a query message to the Ethernet controller and the Ethernet diagnostic device via the IGMP, and to maintain and remove registration of the Ethernet controller and the Ethernet diagnostic device based on whether a report message corresponding to the query message is received.

The diagnostic system may further include a CAN controller configured to perform CAN communication, and to operate other loads; a CAN diagnostic device configured to perform the CAN communication, and to diagnose a failure of the CAN controller; and a gateway configured to execute the CAN communication, to perform communication with the CAN controller, the CAN diagnostic device, and the Ethernet switch, and to transmit CAN diagnostic information of the CAN diagnostic device to the Ethernet diagnostic device through the Ethernet switch in response to a request of the Ethernet diagnostic device.

In accordance with another aspect of the disclosure, a diagnostic system may include an Ethernet controller configured to execute an operation of a first electronic device, and to perform communication with the first electronic device using scalable service-oriented middleware on Ethernet/internet protocol (SOME/IP); an Ethernet diagnostic device configured to perform communication with the Ethernet controller using the SOMP/IP, and to diagnose a failure of the Ethernet controller; a CAN controller configured to perform CAN communication, and to execute an operation of a second electronic device; a CAN diagnostic device configured to perform the CAN communication, and to diagnose a failure of the CAN controller; and an integrated communication device configured to transmit and receive messages between the Ethernet controller and the Ethernet diagnostic device, to execute the CAN communication between the CAN controller and the CAN diagnostic device, and to transmit CAN diagnostic information of the CAN diagnostic device to the Ethernet diagnostic device in response to a request of the Ethernet diagnostic device.

A message format of the SOME/IP may include a payload configured to transmit and receive diagnostic request data and response data for diagnosing the failure, and to a SOME/IP header having identification information for diagnosing the failure, a transport protocol, and an IP header. The SOME/IP header may include service identification information ID, Method identification information ID, client identification information ID, session identification information ID, and a message type. The Ethernet controller and the Ethernet diagnostic device may be configured to perform communication via a SOME/IP service discovery (SD) area to discover for a service or provide the service. The integrated communication device may be configured to register or remove the Ethernet controller and the Ethernet diagnostic device from a member list by communicating with the Ethernet controller and the Ethernet diagnostic device through an Internet group management protocol (IGMP).

In accordance with another aspect of the disclosure, a vehicle may include a plurality of Ethernet controllers configured to execute operations of a plurality of first electronic devices, and to perform communication using scalable service-oriented middleware on Ethernet/internet protocol (SOME/IP); an Ethernet switch configured to generate a communication path between the plurality of Ethernet controllers, and to execute communication between the plurality of Ethernet controllers based on the generated path; a plurality of CAN controllers configured to execute operations of a plurality of second electronic devices, and to perform CAN communication; and a gateway configured to execute the CAN communication with the plurality of CAN controllers, to execute communication with the Ethernet switch, and to transmit CAN diagnostic information of the CAN controller to the Ethernet switch.

The vehicle may further include an Ethernet diagnostic device connected to the Ethernet switch, configured to perform communication with the plurality of Ethernet controllers using the SOMP/IP, and to diagnose failures of the plurality of Ethernet controllers. A message format of the SOME/IP may include a payload configured to transmit and receive diagnostic request data and response data for diagnosing the failure, and to a SOME/IP header having identification information for diagnosing the failure, a transport protocol, and an IP header. The SOME/IP header may include service identification information ID, Method identification information ID, client identification information ID, session identification information ID, and a message type.

The plurality of Ethernet controllers and the Ethernet diagnostic device may be configured to perform communication through a SOME/IP service discovery (SD) area to discover for a service or provide the service. The Ethernet switch may be configured to register or remove the plurality of Ethernet controllers and the Ethernet diagnostic device from a member list by communicating with the plurality of Ethernet controllers and the Ethernet diagnostic device via an Internet group management protocol (IGMP). The vehicle may further include a CAN diagnostic device configured to perform the CAN communication, and to diagnose failures of the plurality of CAN controllers. An Ethernet diagnostic device configured to diagnose failures of the plurality of Ethernet controllers using the SOMP/IP are connected to the Ethernet switch.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
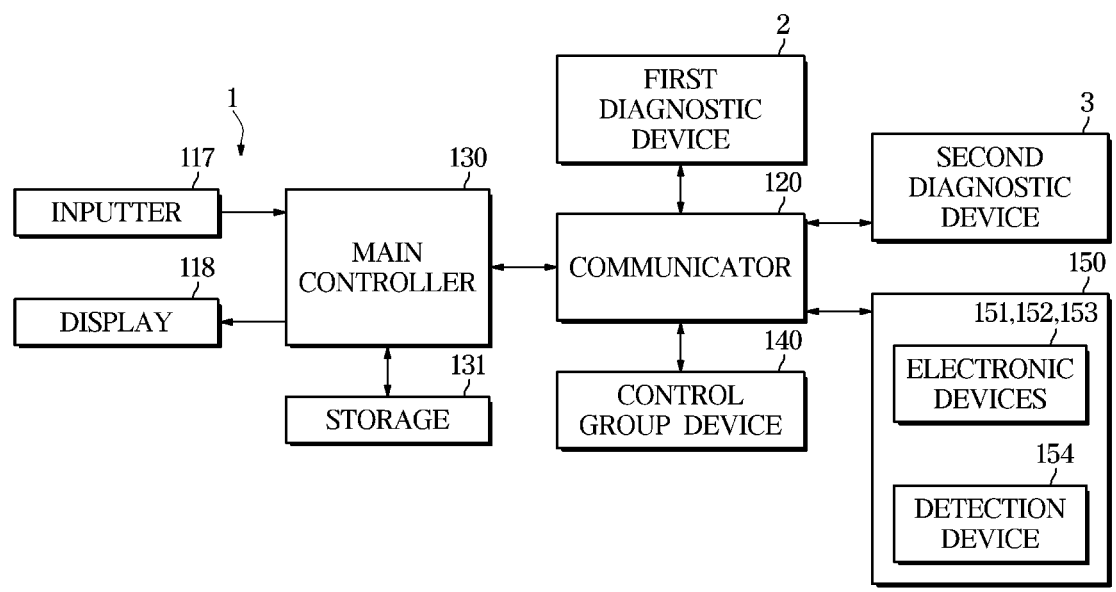
FIG. 1 is a control configuration diagram of a vehicle according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like reference numerals refer to like elements throughout the specification. Not all elements of embodiments of the disclosure will be described, and description of what are commonly known in the art or what overlap each other in the exemplary embodiments will be omitted. The terms as used throughout the specification, such as "~ part," "~ module," "~ member," "~ block," etc., may be implemented in software and/or hardware, and a plurality of "~ parts," "~ modules," "~ members," or "~ blocks" may be implemented in a single element, or a single "~ part," "~ module," "~ member," or "~ block" may include a plurality of elements.

It will be understood that when an element is referred to as being "connected" to another element, it can be directly or indirectly connected to the other element, wherein the indirect connection includes "connection" via a wireless communication network.

Further, when it is stated that a layer is "on" another layer or substrate, the layer may be directly on another layer or substrate or a third layer may be disposed therebetween. It will be understood that, although the terms first, second, third, etc., may be used herein to describe various elements, it should not be limited by these terms. These terms are only used to distinguish one element from another element. An identification code is used for the convenience of the description but is not intended to illustrate the order of each step. Each of the steps may be implemented in an order different from the illustrated order unless the context clearly indicates otherwise.

Hereinafter, the operation principles and embodiments of the disclosure will be described with reference to the accompanying drawings. FIG. 1 is a control configuration diagram of a vehicle according to an exemplary embodiment. A vehicle 1 may include a body with exterior and interior parts, and a chassis on which mechanical devices required for driving are installed.

The exterior parts of the body may include some that are provided to be opened and closed. The exterior parts may include a front bumper, a hood, a roof panel, a rear bumper, front, rear, left and right doors, and window glasses, and may further include a side mirror or the like that provides a view of the rear of the vehicle 1 to a driver. The interior part of the body may include seats for people to sit on, a dashboard, an instrument panel (or cluster) placed on the dashboard and configured to display driving information and status information, heating wires for supplying heat to the seats, and a ventilation device for circulating air in the seats. The interior part of the body may further include a head unit provided in a center fascia.

The head unit may be connected to various loads that perform an audio function, a radio function, an air conditioning function, a seat heating function, a ventilation function, a navigation function, a DMV function, and a telephone function. The head unit may be configured to receive operation commands for performing each function and execute the operation of each function based on the input operation command or transmit the operation command to a corresponding load.

The vehicle 1 may further include an inputter 117 configured to receive the operation command of at least one function among a plurality of functions capable of being performed in the vehicle 1. The vehicle 1 may further include a display 118 configured to display information about a function being performed and information input by a user and displaying communication error information. The inputter 117 may be provided in the head unit or the center fascia, and may include at least one physical button such as an operation on/off button for various functions, a button for changing setting values of various functions, and the like.

The inputter 117 may be provided with a jog dial or a touch pad for inputting a movement command and a selection command of a cursor displayed on the display 118. The inputter 117 may be configured to receive a user input, and receive input information corresponding to the user input or a command for transmitting and receiving a message. The display 118 may be configured to display operation information of electronic devices and transmission/reception information of the message between the electronic devices, and error information of the electronic devices or communication. The display 118 may be provided as a flat panel display device such as a liquid crystal display (LCD), an organic light emitting diode (OLED), and a plasma display panel (PDP).

The vehicle 1 may further include a vehicle terminal (AVN; audio-video navigation) provided in the interior of the vehicle. The vehicle terminal may include the inputter 117 and the display 118. When at least one function of a navigation function, a digital multimedia broadcasting (DMB) function, an audio function, a video function, a telephone function, and a radio function is selected, the vehicle terminal may be configured to perform at least one selected function and display operation information of the function being performed. The inputter 117 and the display 118 of the vehicle terminal may be provided as a touch screen.

The vehicle 1 may include an electronic control unit (ECU) configured to operate the electronic devices such as a seat position adjustment device, a seat heating and ventilation device, a window glass opening and closing device, a door opening and closing device, a side mirror angle adjustment device, the cluster, the head unit, the display, and the vehicle terminal. The chassis of the vehicle 1 may further include a power generating device, a power transmission device, a driving device, a steering device, a braking device, a suspension device, a transmission device, a fuel device, front, rear, left and right wheels, and the like.

The vehicle 1 may include the ECU configured to adjust driving of the electronic devices such as the power generating device, the power transmission device, the driving device, the steering device, the braking device, the suspension device, the transmission device, the fuel device, various safety devices, and various sensors. In particular, the ECU (hereinafter referred to as "controller") may be provided for each electronic device, or may be provided as one to integrally operate a plurality of electronic devices.

The vehicle 1 may include a communicator 120 configured to perform communication between various electronic devices therein. The communicator 120 may be connected to each of the plurality of controllers for operating various loads of the vehicle 1 by wire, may be connected to a main controller 130 by wire, and may be configured to transmit and receive at least one of a control signal, an operation signal, and a detection signal between different controllers via the wires. In particular, a load 150 may include electronic devices 151, 152, and 153 for performing at least one function, and may further include a detection device 154 configured to detect at least one information about a state of the vehicle 1.

The communicator 120 may further include a global positioning system (GPS) receiver configured to obtain position information from satellites. The communicator 120 may include one or more components that enable communication with various external devices, for example, at least one of a short-range communication module, a wired communication module, and a wireless communication module.

The short-range communication module may include various short-range communication modules configured to transmit and receive signals within a short range over a wireless communication network, such as a Bluetooth module, an infrared communication module, a radio frequency identification (RFID) communication module, a wireless local access network (WLAN) communication module, a near field communication (NFC) module, a Zigbee communication module, etc.

The wired communication module may include not only one of the various wired communication modules, such as a controller area network (CAN) communication module, a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or a plain old telephone service (POTS). In particular, the LAN module is the most representative bus-structured Ethernet communication.

The wireless communication module may include a wireless fidelity (WiFi) module, a wireless broadband (WiBro) module, and/or any wireless communication module for supporting various wireless communication schemes, such as a global system for a mobile communication (GSM) module, a code division multiple access (CDMA) module, a wideband code division multiple access (WCDMA) module, a universal mobile telecommunications system (UMTS), a time division multiple access (TDMA) module, a long-term evolution (LTE) module, and the like.

The communicator 120 of the exemplary embodiment may further include the CAN communication module and an Ethernet communication module. The CAN communication module may be configured to transmit the control signal to at least one of at least one controller, the electronic device, and the detection device via two communication lines, a high line and a low line, and may be configured to transmit thousands of signals per second when transmitting the signal.

The CAN communication module may be divided into a low speed CAN communication module and a high speed CAN communication module according to a communication speed of transmitting and receiving the control signal. In particular, the low speed CAN communication module may be the CAN communication module having a communication speed less than a reference speed, and the high speed CAN communication module may be the CAN communication module having a communication speed greater than or equal to the reference speed.

The low speed CAN communication module may include a multimedia CAN (M-CAN) communication module and a body CAN (B-CAN) communication module that transmits and receives signals for operating various electronic devices. Among the electronic devices that perform CAN communication, the electronic device may be configured to transmit data may broadcast a message to be transmitted, and the controller that receives data may be configured to receive only the message having identification information (ID) of the message necessary for realizing its function among the messages being broadcast.

The electronic device performing Ethernet communication may be configured to transmit the message, but also transmit identification information (or IP information) of the electronic device to be transmitted to an Ethernet switch. At this time, the Ethernet switch may be configured to transmit the message to the electronic device based on the IP information. The main controller 130 may be configured to execute communication between the plurality of controllers provided in the vehicle 1, manage the plurality of controllers, and execute the operation of the plurality of controllers.

The main controller 130 may also be configured to execute communication with the first diagnostic device 2 and a second diagnostic device 3. The main controller 130 may be configured to execute the operation of the display 118 to display the error information stored in the storage 131 through the display 118 when an output command input through the inputter 117 is received. When a transmission command input through the inputter 117 is received, the main controller 130 may be configured to execute the operation of the communicator 120 to transmit the error information stored in the storage 131 to the first diagnostic device 2 or the second diagnostic device 3 through the communicator 120.

The main controller 130 may be configured to execute the operation of the display 118 to output information about a connection request of the first diagnostic device 2 or the second diagnostic device 3. The main controller 130 may be configured to determine whether the communicator 120 is normally connected to the first diagnostic device 2 and determine whether the communicator 120 is normally connected to the second diagnostic device 3 by identifying communication possibility with the first diagnostic device 2 or the second diagnostic device 3.

When a command for providing the error information is received from the first diagnostic device 2, the main controller 130 may be configured to execute the operation of the communicator 120 to transmit the error information stored in the storage 131 to the first diagnostic device 2 through the communicator 120. The main controller 130 may be configured to execute the operation of the communicator 120 to transmit the error information stored in the storage 131 to the second diagnostic device 3 through the communicator 120 when the command for providing the error information is received from the second diagnostic device 3.

When the command for outputting the error information is received or the command for transmitting the error information is received, the main controller 130 may be configured to request transmission of the error information to the plurality of controllers, receive the error information from at least one controller among the plurality of controllers, and operate communicator 120 to transmit the received error information to the first diagnostic device 2 or the second diagnostic device 3.

When the error information is received from at least one controller, the main controller 130 may also be configured to store the received error information in the storage 131. When a communication signal for error diagnosis is received from the at least one controller, the main controller 130 may be configured to transmit a response signal corresponding to the received communication signal to the at least one controller. When the main controller 130 transmits communication signals to the plurality of controllers, the main controller 130 may be configured to sequentially transmit the communication signals from the controller provided in a position close to the main controller 130. In particular, determining the communication error of any one of the controllers may include determining by a connection failure of a connector connected to one of the controllers, a short of the connector, or a short of a wire of the communication module.

The main controller 130 may be implemented with the memory storing an algorithm to control operation of the components in the vehicle 1 or data about a program that implements the algorithm, and the processor carrying out the aforementioned operation using the data stored in the memory. The memory and the processor may be implemented in separate chips. Alternatively, the memory and the processor may be implemented in a single chip. The storage 131 may be configured to store the error information. In particular, the error information may include identification information and an error code of the controller in which the error occurred, and may further include an error code name, and may include the number of times the signal of the controller in the same control group is received.

The storage 131 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as a hard disk drive (HDD) or a compact disk (CD) ROM, without being limited thereto. The storage 131 may be a memory implemented with a chip separate from the aforementioned processor in relation to the main controller 130, or may be implemented integrally with the processor in a single chip.

A control group device 140 may include a plurality of control groups performing different communication. Particularly, the plurality of control groups may be respectively connected to different communication modules. In other words, the plurality of controllers in the same group may be configured to perform the same communication with each other. Each of the control groups may include one or more controllers, and may be configured to operate at least one load using one or more controllers. Some of the plurality of controllers may be provided inside the load.

A load device 150 may include a plurality of loads. In particular, the plurality of loads may include the electronic devices 151 to 153 configured to perform at least one function, and may further include the detection device 154 configured to detect at least one information. Each of the electronic devices 151 to 153 may be operated by one or a plurality of controllers provided in the control group to which each of the electronic devices is connected.

The detection device 154 may include a speed detection device configured to detect a driving speed of the vehicle 1. Particularly, the speed detection device may be a wheel speed sensor provided in front, rear, left, and right wheels or an acceleration sensor configured to detect an acceleration of the vehicle 1. In addition, the detection device 154 may further include at least one of a plurality of distance sensors configured to detect distances from other vehicles and obstacles in the vicinity, an angular speed sensor configured to detect an angular speed of a steering wheel to detect a steering angle of the vehicle 1, a yaw rate sensor configured to detect a yaw moment of the vehicle 1, an illuminance sensor configured to detect external illuminance, and a door opening/closing sensor.

Figure 2:
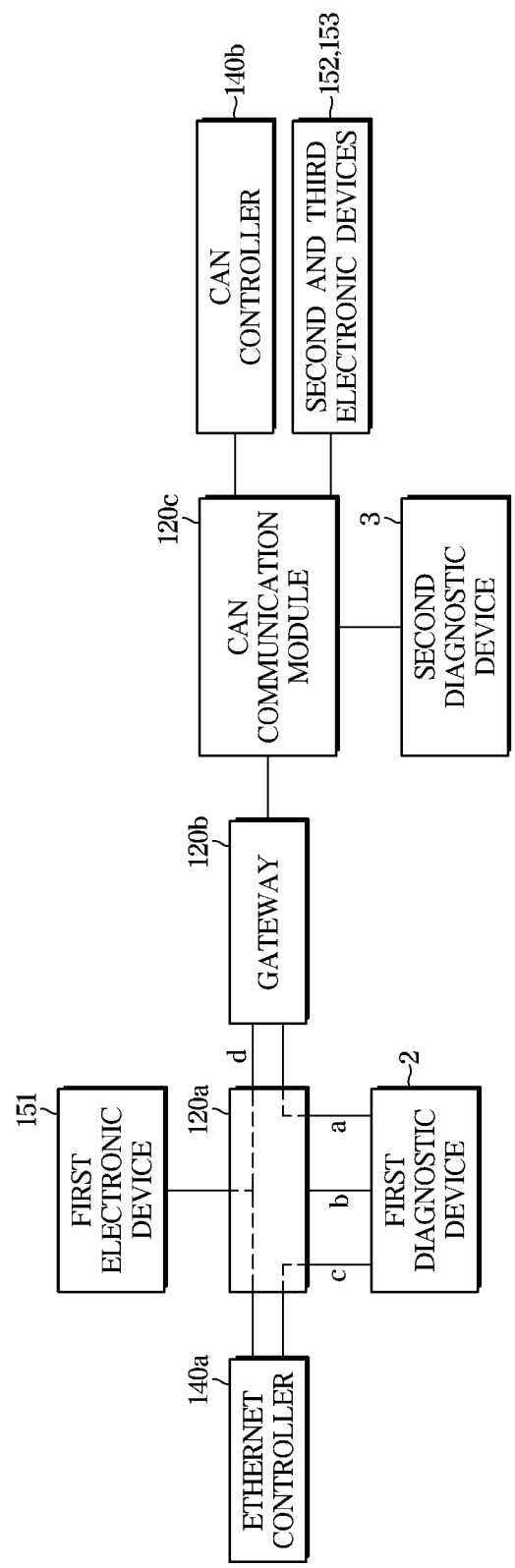
FIG. 2 is an exemplary view of a communicator provided in a vehicle according to an exemplary embodiment.
Figure 3:
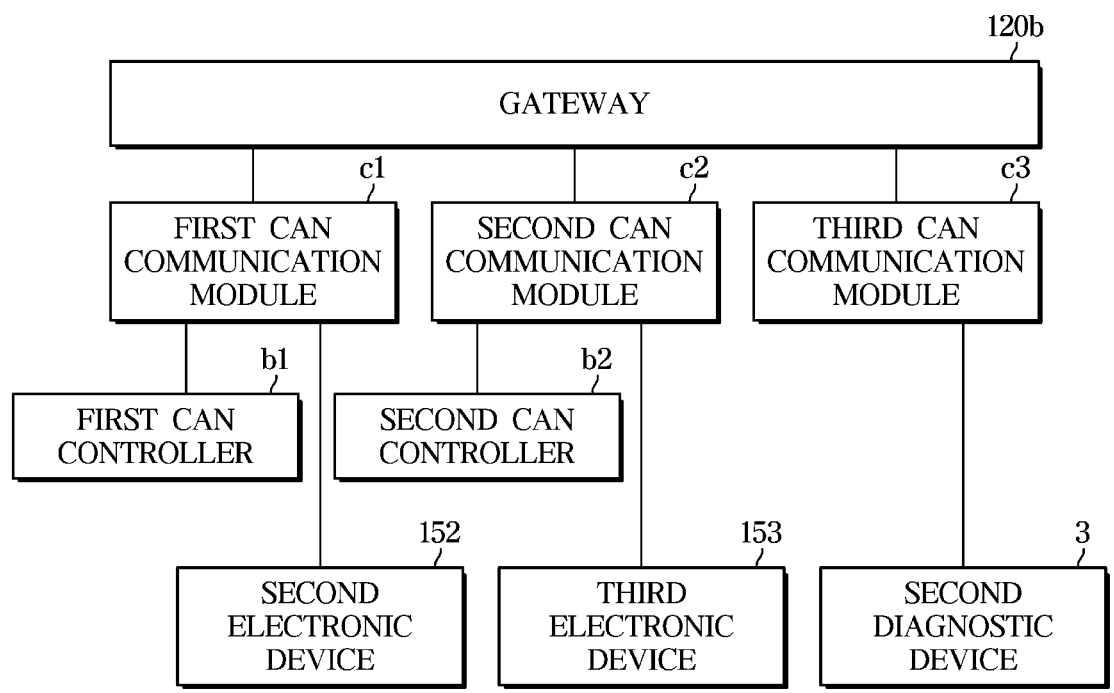
FIG. 3 is an exemplary view of a controller area network (CAN) communication module in a communicator illustrated in FIG. 2 according to an exemplary embodiment.
Figure 4:
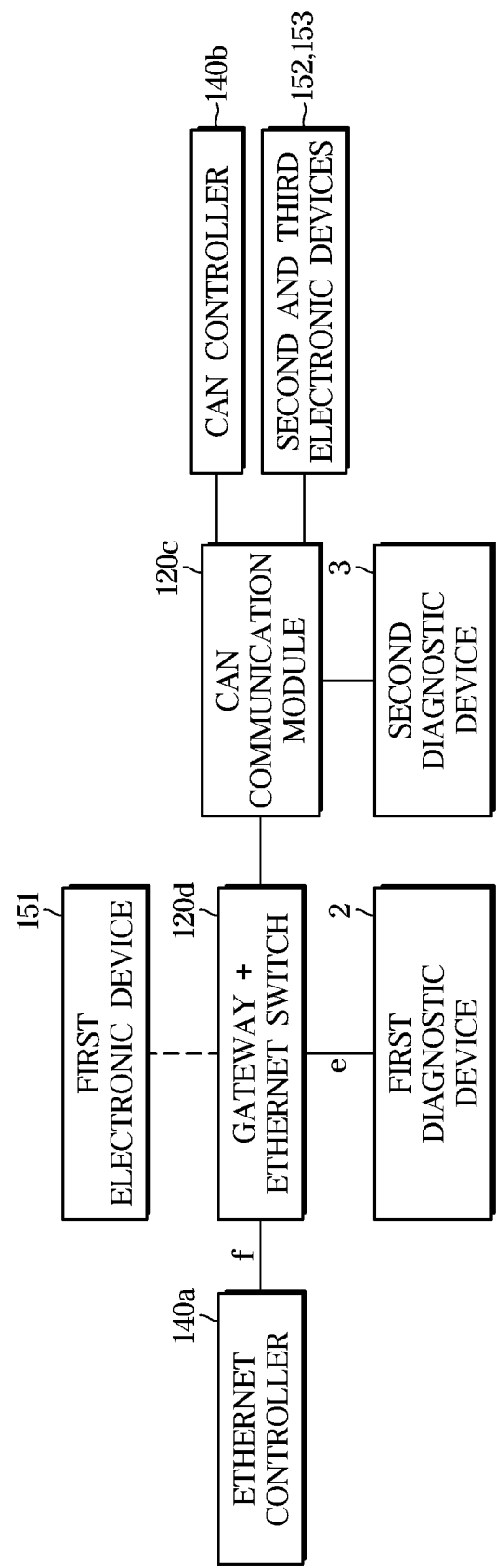
FIG. 4 is another exemplary view of a communicator provided in a vehicle according to an exemplary embodiment.

FIG. 2 is an exemplary view of a communicator provided in a vehicle according to an exemplary embodiment, FIG. 3 is an exemplary view of a controller area network (CAN) communication module in a communicator illustrated in FIG. 2, and FIG. 4 is another exemplary view of a communicator provided in a vehicle according to an embodiment.

Referring to FIG. 2, the communicator 120 may include an Ethernet switch 120a, a gateway 120b, and a CAN communication module 120c. In addition, the CAN communication module 120c may be provided inside the gateway 120a. The Ethernet switch 120a may be provided separately from the gateway 120b. The Ethernet switch 120a may store IP information of a plurality of Ethernet controllers. The Ethernet switch 120a may also store the IP information of the Ethernet controller to be received for each message.

When the message and the IP information are received, the Ethernet switch 120a may generate a path based on the received IP address and control transmission of the received message along the generated route. The Ethernet switch 120a may also be configured to store a transmission path of messages for each message. The Ethernet switch 120a may be configured to store the IP information of the controller that is to be transmitted for each message and the IP information of the controller that is to be received. The path of the Ethernet switch 120a may be a unicast (1:1) path or a multicast (1:n) path based on the number of controllers receiving the message.

An Ethernet controller 140a, a first electronic device 151, and the first diagnostic device 2 may be connected to the Ethernet switch 120a. In particular, the first diagnostic device 2 may be detachably connected to the Ethernet switch 120a. The Ethernet controller 140a connected to the Ethernet switch 120a may be one or a plurality. The first electronic device 151 connected to the Ethernet switch 120a may be one or more. The first diagnostic device 2 may be configured to diagnose a failure of the Ethernet controller 140a connected to the Ethernet switch 120a. The first diagnostic device 2 may be connected to the gateway 120b via the Ethernet switch 120a.

When performing diagnosis of various controllers and electronic devices provided in the vehicle 1 using the first diagnostic device 2, the Ethernet switch 120a may be configured to perform a connection (a) with the first diagnostic device 2 to transmit and receive messages with the first diagnostic device 2. At this time, the gateway 120b may be configured to broadcast the message of the first diagnostic device 2. The Ethernet switch 120a may be configured to perform a connection (b) with the first diagnostic device 2 to transmit and receive messages for secure or authenticated access.

The Ethernet switch 120a may be configured to perform a connection (c) between the first diagnostic device 2 and the Ethernet controller 140a to transmit and receive messages between the first diagnostic device 2 and the Ethernet controller 140a. The Ethernet switch 120a may be configured to perform a connection d between the Ethernet controller 140a and the second diagnostic device 3 to transmit and receive data between the Ethernet controller 140a and the second diagnostic device 3.

The Ethernet switch 120a may be configured to receive error information of a CAN controller 140b via the gateway 120b and transmit the received error information of the CAN controller 140b to the first diagnostic device 2. The gateway 120b may be configured to communicate with the CAN communication module 120c, and execute communication with the CAN communication module 120c. The gateway 120b may be configured to transmit the response signal to a CAN controller 140b when the communication signal for error diagnosis is received from the CAN controller 140b performing the CAN communication.

When the identification information and the control signal of the CAN controller are received from some of the CAN controllers among the plurality of CAN controllers, the gateway 120*b* may be configured to determine that a communication error related to timeout has occurred in at least one CAN controller among the remaining CAN controllers based on arrangement information of the plurality of CAN controllers. When the response signal is not received from the plurality of CAN controllers for a predetermined time, the gateway 120*b* may be configured to determine the error code as bus off and store the determined error code.

Additionally, the gateway 120*b* may be configured to store the error code as a message error when a message for status information different from the actual state of the vehicle 1 is received from at least one CAN controller or a message for detection information outside a normal range is received. In response to determining that the message error has generated, the gateway 120*b* may be configured to sequentially transmit the communication signals to the plurality of CAN controllers, determine the CAN controller that has generated the message error based on the received response signals of at least one CAN controller, and store the determined identification information of at least one CAN controller and the error code for the message error.

The CAN communication module 120*c* may be one or plural. The plurality of CAN communication modules 120*c* may be different types of CAN communication modules. In addition, the plurality of CAN communication modules 120*c* may be the CAN communication modules having different communication speeds and uses.

The CAN communication module 120*c* may be at least one of a multimedia CAN (M-CAN) communication module and a body CAN (B-CAN) communication module that transmits and receives signals for operating various electronic devices, a power train CAN (P-CAN) communication module that transmits and receives signals for controlling power train, stability control (ABS, active suspension, etc.), and transmission function in real time, a chassis CAN (C-CAN) communication module, and a diagnosis CAN (D-CAN) communication module for error diagnosis, or more.

At least one CAN controller may be connected to two wires of the CAN communication module, the electronic device whose operation is executed by the at least one CAN controller may be connected to two wires of the CAN communication module, and the detection device (i.e., sensor) for transmission the signal whose operation is executed and detected by the at least one CAN controller may be connected to two wires of the CAN communication module.

The CAN controller, the electronic device, and the detection device that require the same communication method and communication speed within the same range may be connected to one CAN communication module. And the at least one CAN controller, the electronic device, and the detection device connected to two wires of one CAN communication module may be connected to each other by the connector.

The second diagnostic device 3 may be connected to the two wires of the CAN communication module 120*c*. In particular, the second diagnostic device 3 may be detachably connected to the CAN communication module 120*c*. The control group device 140 may include the Ethernet controller 140*a* and the CAN controller 140*b*. The Ethernet controller 140*a* may be one or plural. The CAN controllers 140*b* may be one or more.

The Ethernet controller 140*a* may be configured to operate at least one load (i.e., electronic device or detection device). The CAN controller 140*b* may be configured to operate at least one load (i.e., electronic device or detection device), but may be configured to operate the load that is not operated by the Ethernet controller 140*a*. For example, the Ethernet controller 140*a* may be configured to operate the first electronic device 151, and the CAN controller 140*b* may be configured to operate the second and third electronic devices 152 and 153. The Ethernet controller 140*a* for executing the operation of the first electronic device 151 may be one or a plurality.

As illustrated in FIG. 3, the second and third electronic devices 152 and 153 may be configured to perform different CAN communication, and in this case, the plurality of CAN communication modules 120*c* may be provided. The second electronic device 152 may be configured to perform first CAN communication via a first CAN communication module c1, and may be operated by a first CAN controller b1 performing the first CAN communication. The first CAN controller b1 for executing the operation of the second electronic device 152 may be one or more. The third electronic device 153 may be configured to perform second CAN communication via a second CAN communication module c2, and may be operated by a second CAN controller b2 performing the second CAN communication.

The second CAN controller b2 for executing the operation of the third electronic device 153 may be one or more. In addition, the second diagnostic device 3 may be configured to perform different CAN communication with the second and third electronic devices 152 and 153. In particular, the second diagnostic device 3 may be connected to the CAN communication module connected to the second and third electronic devices 152 and 153 and another CAN communication module. In other words, the second diagnostic device 3 may be configured to perform third CAN communication via a third CAN communication module c3 and may be operated by the gateway 120*b* via the third CAN communication. The first and second diagnostic device 2 and 3 may be devices managed by a service center or a workshop. The first diagnostic device 2 may be provided in the vehicle 1, and may be provided in any one Ethernet controller among the plurality of Ethernet controller.

As illustrated in FIG. 4, the gateway may be provided in the Ethernet switch. In other words, the communicator may be provided as an integrated communication device 120*d* in which the Ethernet switch and the gateway are integrally integrated. In addition, the communicator may be provided with CAN communication module 120*c* in the integrated communication device 120*d*. The integrated communication device 120*d* may perform both the function of the gateway and the function of the Ethernet switch described in FIG. 2.

When the diagnosis is performed using the integrated communication device 120*d*, the integrated communication device 120*d* may be configured to perform a connection e for transmitting and receiving data with the first diagnostic device 2. At this time, the first diagnostic device 2 and the integrated communication device 120*d* may be configured to perform communication for transmitting and receiving authentication (security access), physical, and functional messages. The integrated communication device 120*d* may be configured to perform a connection f for transmitting and receiving data to and from the Ethernet controller 140*a*. At this time, the integrated communication device 120*d* and the Ethernet controller 140*a* may be configured to perform communication for transmitting and receiving physical and functional messages.

At least one component may be added or deleted in response to the performance of the components of the vehicle 1 illustrated in FIGS. 1, 2, 3 and 4. In addition, it will be readily understood by those skilled in the art that the mutual positions of the components may be changed corresponding to the performance or structure of the vehicle 1. Meanwhile, each component illustrated in FIGS. 1, 2, 3, and 4 may refer to software and/or hardware components such as a field programmable gate array (FPGA) and an application specific integrated circuit (ASIC).

Figure 5:
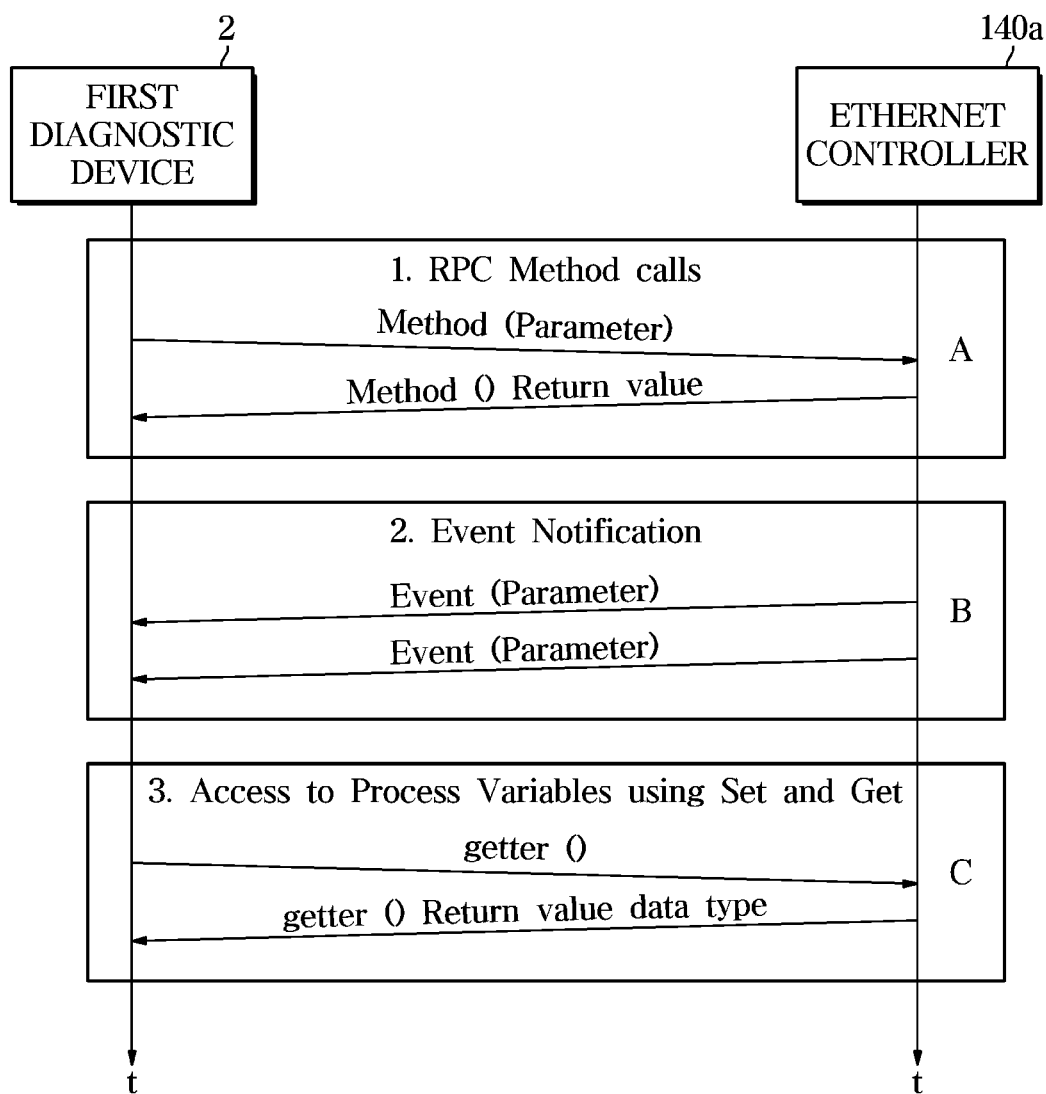
FIG. 5 is an exemplary view of communication using scalable service-oriented middleware on Ethernet/internet protocol (SOME/IP) between an Ethernet controller provided in a vehicle and a first diagnostic device according to an exemplary embodiment.
Figure 6:
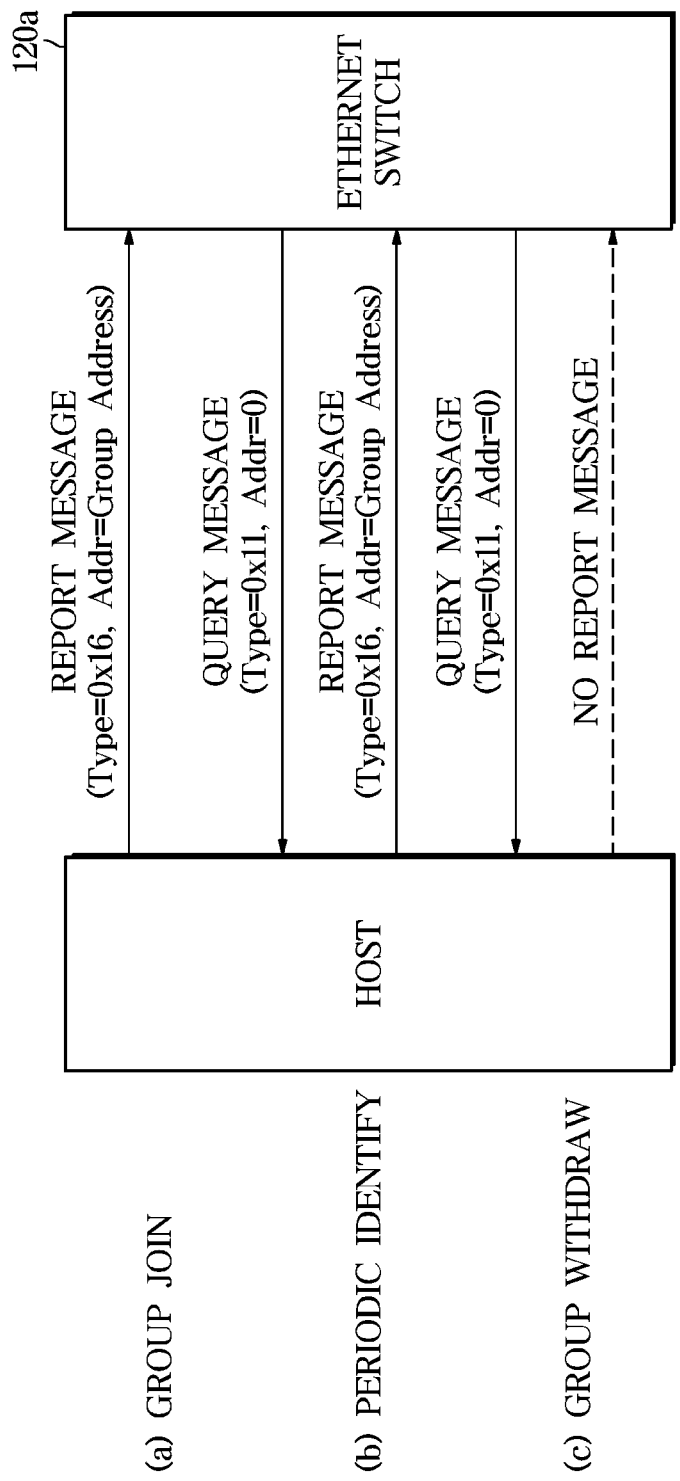
FIG. 6 is an exemplary view of communication between an Ethernet switch and an Ethernet controller of a communicator provided in a vehicle according to an exemplary embodiment.

FIG. 5 is an exemplary view of communication using scalable service-oriented middleware on Ethernet/internet protocol (SOME/IP) between an Ethernet controller provided in a vehicle and a first diagnostic device according to an exemplary embodiment, and FIG. 6 is an exemplary view of communication between an Ethernet switch and an Ethernet controller of a communicator provided in a vehicle according to an exemplary embodiment.

The first diagnostic device 2 may be configured to communicate with the Ethernet controller 140a using scalable service-oriented middleware on Ethernet/internet protocol (SOME/IP). The SOME/IP may be a dynamic and service-oriented IP network communication bus, and may be a communication protocol that transmits only necessary data at a required time. As illustrated in FIG. 5, the SOME/IP may be approximately divided into three parts: service discovery (SD), remote procedure call (RPC), and access for data processing.

The SD may allow the first diagnostic device 2 to discover for services or provide other services on the network. The user may utilize a method of providing the SD through the RPC (area A in FIG. 5). Additionally, it may be possible to set a notification for a specific event (area B in FIG. 5). Applications may use a read/write function to access specific process data (area C in FIG. 5). The SOME/IP may optimally use an available bandwidth to implement flexible communication.

As illustrated in FIG. 6, the Ethernet switch 120a may be configured to communicate with a host using an Internet Group Management Protocol (IGMP). In particular, the host may be the Ethernet controller 140a or the first diagnostic device 2. The Ethernet switch 120a may be a router. The IGMP may be a protocol used when the host registers or withdraws (or removes) a multicast group, and exchange group member information between the host and the Ethernet switch 120a.

More specifically, the host may be configured to transmit an IGMP report message indicating a multicast address to the Ethernet switch 120a to join the multicast group. In particular, the Ethernet switch 120a may be configured to register the host as a member of the multicast group based on the received IGMP report message. The Ethernet switch 120a may be configured to periodically identify a member list belonging to the multicast group using an IGMP query message to effectively manage the member list belonging to the multicast group. In other words, the Ethernet switch 120a may be configured to transmit the IGMP query message to the host. Particularly, the host may be configured to transmit the IGMP report message to the Ethernet switch 120a in response to the reception of the IGMP query message to maintain the multicast group member.

In response to the transmission of the IGMP query message, the Ethernet switch 120a may proceed to withdraw from the host that has not transmitted the IGMP report message. In other words, the Ethernet switch 120a may consider the host to withdraw the multicast group when the host does not respond to the IGMP report message to the IGMP query message.

Figure 7:
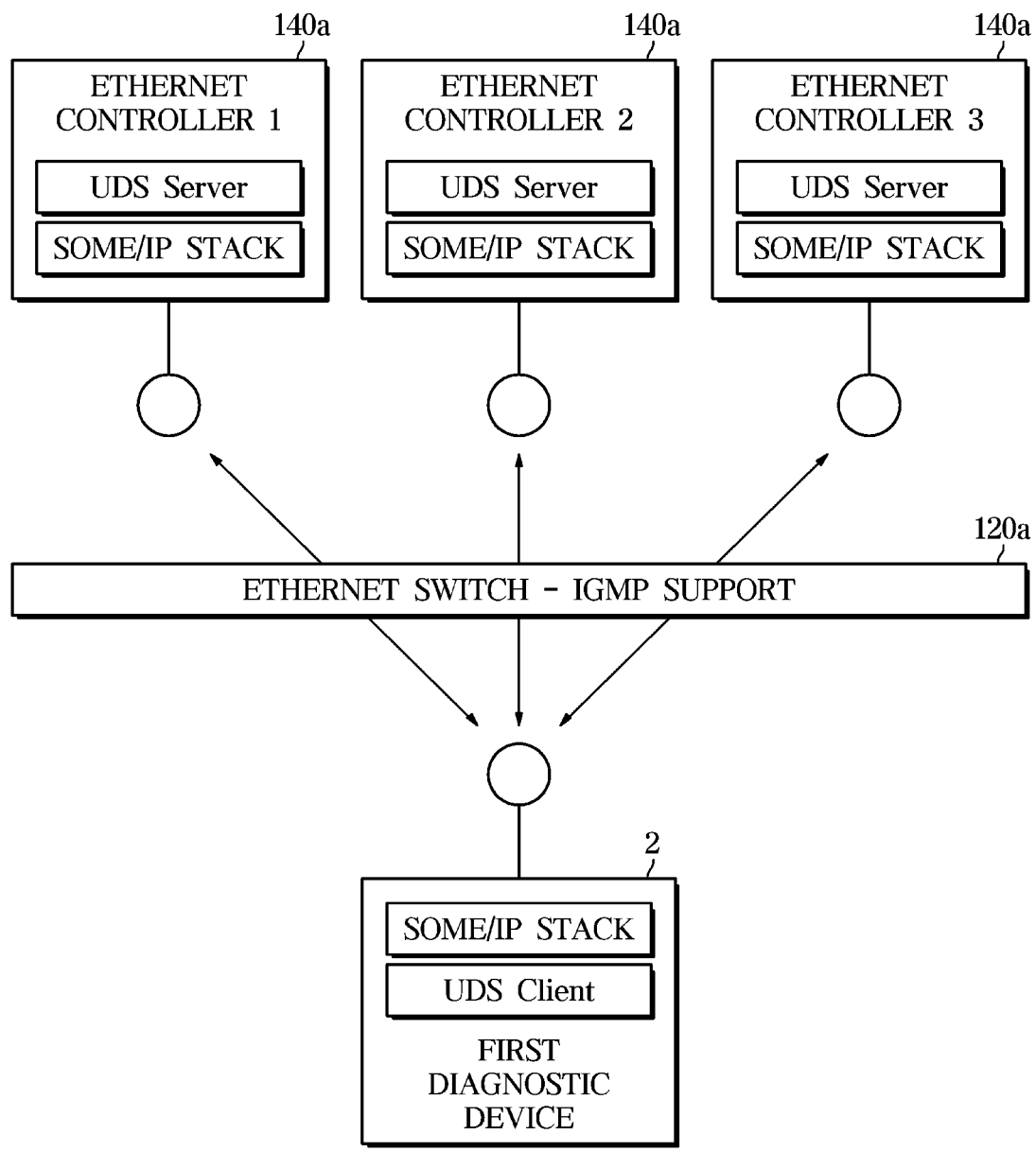
FIG. 7 is an exemplary view of communication between an Ethernet switch, an Ethernet controller, and a first diagnostic device of a communicator provided in a vehicle according to an exemplary embodiment.
Figures 8A, 8B:
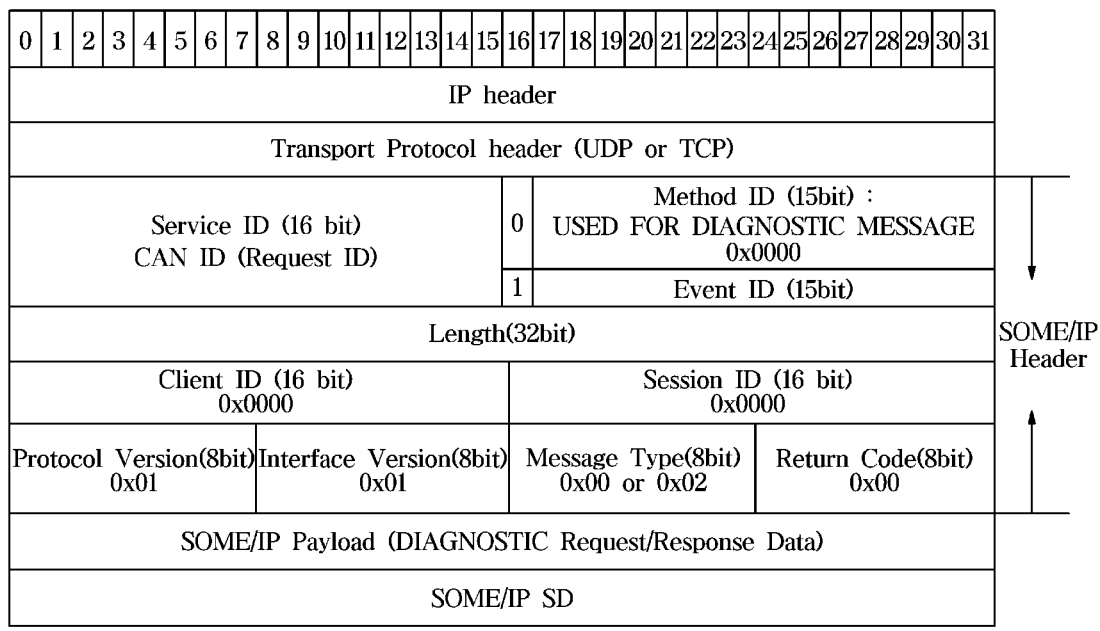
FIG. 8A is an exemplary view of an SOME/IP diagnostic message format of an Ethernet controller and a first diagnostic device provided in a vehicle according to an exemplary embodiment.
FIG. 8B is a view illustrating items and contents of the SOME/IP diagnostic message format illustrated in FIG. 8A.

FIG. 7 is an exemplary view of communication between an Ethernet switch, an Ethernet controller, and a first diagnostic device of a communicator provided in a vehicle according to an exemplary embodiment. FIG. 8A is an exemplary view of an SOME/IP diagnostic message format of an Ethernet controller and a first diagnostic device provided in a vehicle according to an exemplary embodiment, and FIG. 8B is a view illustrating items and contents of the SOME/IP diagnostic message format illustrated in FIG. 8A.

The Ethernet controller 140a and the first diagnostic device 2 may support the SOME/IP, and the Ethernet switch 120a may support the IGMP. The Ethernet controller 140a and the first diagnostic device 2 may be implemented in various ways based on the network topology. For example, the first diagnostic device 2 may be provided in the Ethernet controller 140a. As another example, the first diagnostic device 2 may be provided in the vehicle 1, but may be provided separately from the Ethernet controller 140a, or may be provided in the external device 20 of the vehicle 1.

The first diagnostic device 2 (client) may be logically configured with the Ethernet controller 140a (server). The physical connection between the first diagnostic device 2 and the Ethernet controller 140a may be to discover a position of the Ethernet controller (140a) through a SOME/IP SD area, and may be to make a network connection from the Ethernet switch 120a through the IGMP.

A message format of SOME/IP is as illustrated in FIG. 8A. The contents of each item in the diagnostic message format illustrated in FIG. 8A are as illustrated in FIG. 8B. The message format of SOME/IP may include a SOME/IP header having identification information for diagnosing a failure, and a payload for transmitting and receiving diagnostic request data and response data for diagnosing the failure. The payload may contain serialized data.

The SOME/IP header may include service identification information (ID), Method identification information ID, client (which may be first diagnostic device) identification information ID, session identification information ID, and a message type. The service identification information ID may include Ethernet diagnosis request identification information and CAN diagnosis request identification information.

The message format of SOME/IP may include a transport protocol for transmitting the message and an IP header. A basic transport protocol in the message format of SOME/IP may include User Datagram Protocol (UDP) for transmitting small messages or Transmission Control Protocol (TCP) for transmitting large messages. Additionally, below the message format of SOME/IP may be a SOME/IP SD layer.

Figure 9:
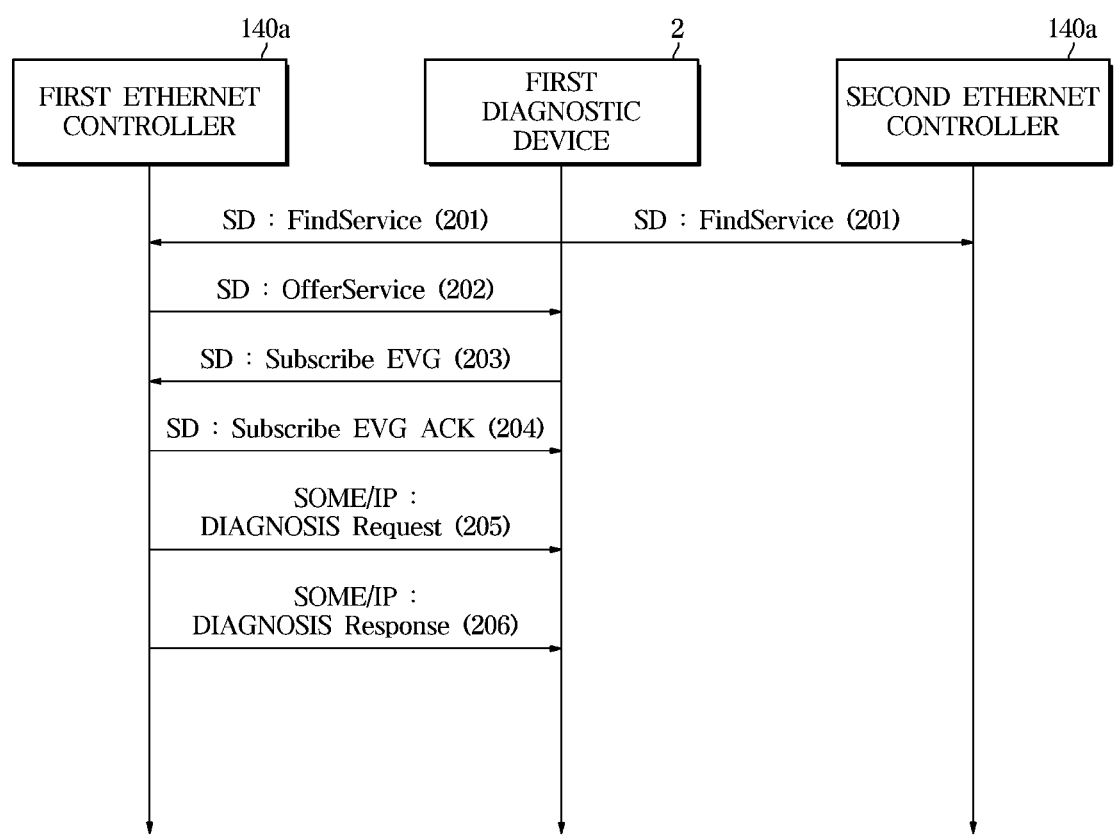
FIG. 9 is an exemplary view of communication between a plurality of Ethernet controllers provided in a vehicle and a first diagnostic device according to an exemplary embodiment.

FIG. 9 is an exemplary view of communication between a plurality of Ethernet controllers provided in a vehicle and a first diagnostic device. The first diagnostic device 2 may be configured to transmit a service discovery message to the plurality of Ethernet controllers 140a through a SD area to discover for whether there is a service desired to be provided through first diagnostic device 2 (201). For example, the first diagnostic device 2 may be configured to set the service ID as the Ethernet diagnostic request ID and transmit to the plurality of Ethernet controllers 140a (202). The first diagnostic device 2 may be configured to set the service ID as the CAN diagnostic request ID and transmit to the CAN controller 140b.

In response to the reception of the service discovery message, in response to determining that some or all of the plurality of Ethernet controllers 140a have the service desired to be provided, the response message requesting service provision may be transmitted to the first diagnostic device 2. For example, when the first Ethernet controller 140a desires an Ethernet diagnostic service, in response to reception of the service discovery message, the first Ethernet controller 140a may be configured to transmit the response message for the Ethernet diagnostic service to the first diagnostic device 2.

When the CAN controller desires the CAN diagnostic service, in response to the reception of the service discovery message, the CAN controller may be configured to transmit the response message for the CAN diagnostic service by broadcasting, but transmit the response message to the first diagnostic device 2 via the gateway 120b and the Ethernet switch 120a. The first diagnostic device may be configured to transmit a message for requesting an event group subscription to the first Ethernet controller 140a through the SD area (203). In particular, the first Ethernet controller 140a may be configured to transmit a message to approve the event group subscription to the first diagnostic device 2 in response to receiving the message for the event group subscription (204).

The SOME/IP SD messages may be transmitted via the UDP. The first diagnostic device 2 may be configured to transmit a message for a diagnostic request to the first Ethernet controller 140a via the SOME/IP (205). In particular, when the message for the diagnosis request is received, the first Ethernet controller 140a may be configured to transmit data for diagnosis to the first diagnostic device 2 through the SOME/IP (205). The first diagnostic device 2 and the first Ethernet controller 140a may be configured to transmit messages and data via the SOME/IP. At this time, the TCP or the UDP may be used as the basic transport protocol.

As described above, the disclosure may be a method for implementing a flexible diagnostic communication in a vehicle network architecture change using a SOME/IP communication method. The disclosure may use SOME/IP SD (Service Discovery) and IGMP protocols, and the upper layer, Client/Server, may freely operate as a transport layer. Even if the implementation of the diagnostic device and the Ethernet controller changes, there is no impact on a configuration of an upper application.

The disclosure may have a flexible structure that is not affected by a network configuration even though the diagnostic device (Client) and the Ethernet controller (Server) are variously implemented. Accordingly, the disclosure may reduce a development cost and improve an efficiency because it is not necessary to change an existing device even if a diagnostic architecture is changed for each vehicle type and grade. An infrastructure of diagnostic device may also be maintained.

The disclosure may improve the quality of the diagnostic system and the vehicle, further increase the user's satisfaction, and improve the user's convenience. The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a non-transitory computer-readable recording medium.

The non-transitory computer-readable recording medium may include all types of recording media storing commands that can be interpreted by a computer. For example, the non-transitory computer-readable recording medium may be, for example, ROM, RAM, a magnetic tape, a magnetic disc, flash memory, an optical data storage device, and the like.

Embodiments of the disclosure have thus far been described with reference to the accompanying drawings. It should be apparent to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A diagnostic system, comprising:
   an Ethernet controller configured to operate at least one load, and perform communication with the at least one load using scalable service-oriented middleware on Ethernet/internet protocol (SOME/IP);
   an Ethernet diagnostic device configured to perform communication with the Ethernet controller using the SOME/IP, and diagnose failures of the Ethernet controller and the at least one load; and
   an Ethernet switch configured to generate a path between the Ethernet controller and the Ethernet diagnostic device, and transmit and receive messages between the Ethernet controller and the Ethernet diagnostic device based on the generated path,
   wherein the Ethernet controller and the Ethernet diagnostic device are configured to perform communication via a SOME/IP service discovery (SD) area to discover for a service or provide the service,
   wherein a message format of the SOME/IP includes a transport protocol, an IP header, a SOME/IP header provided a lower layer of transport protocol and having identification information for diagnosing the failure, a payload provided between the SOME/IP service discovery (SD) and the IP header and configured to transmit and receive diagnostic request data and response data for diagnosing the failure, and
   wherein the SOME/IP header includes service identification information ID set as diagnosis request ID, method identification information ID to use diagnostic message, client identification information ID, session identification information ID, and a message type to differentiate between dialogistic request and diagnostic response, in response to diagnosing the failure.

2. The diagnostic system according to claim 1, wherein the Ethernet switch is configured to register or remove the Ethernet controller and the Ethernet diagnostic device from a member list by communicating with the Ethernet controller and the Ethernet diagnostic device through an Internet group management protocol (IGMP).

3. The diagnostic system according to claim 2, wherein the Ethernet switch is configured to periodically transmit a query message to the Ethernet controller and the Ethernet diagnostic device through the IGMP, and to maintain and remove registration of the Ethernet controller and the Ethernet diagnostic device based on whether a report message corresponding to the query message is received.

4. The diagnostic system according to claim 1, further comprising:
   a controller area network (CAN) controller configured to perform CAN communication, and operate other loads;
   a CAN diagnostic device configured to perform the CAN communication, and diagnose a failure of the CAN controller; and
   a gateway configured to execute the CAN communication, perform communication with the CAN controller, the CAN diagnostic device, and the Ethernet switch, and transmit CAN diagnostic information of the CAN diagnostic device to the Ethernet diagnostic device using the Ethernet switch in response to a request of the Ethernet diagnostic device.

5. A vehicle, comprising:
a plurality of Ethernet controllers configured to operate a plurality of first electronic devices, and perform communication using scalable service-oriented middleware on Ethernet/internet protocol (SOME/IP);
an Ethernet switch configured to generate a communication path between the plurality of Ethernet controllers, and execute communication between the plurality of Ethernet controllers based on the generated path;
a plurality of controller area network (CAN) controllers configured to operate a plurality of second electronic devices, and to perform CAN communication; and
a gateway configured to execute the CAN communication with the plurality of CAN controllers, execute communication with the Ethernet switch, and transmit CAN diagnostic information of the CAN controller to the Ethernet switch,
wherein the Ethernet controller is configured to perform communication via a SOME/IP service discovery (SD) area to discover for a service or provide the service,
wherein a message format of the SOME/IP includes a transport protocol, an IP header, a SOME/IP header provided a lower layer of transport protocol and having identification information for diagnosing the failure, a payload provided between the SOME/IP service discovery (SD) and the IP header and configured to transmit and receive diagnostic request data and response data for diagnosing the failure, and
the SOME/IP header includes service identification information ID set as diagnosis request ID, method identification information ID to use diagnostic message, client identification information ID, session identification information ID, and a message type to differentiate between dialogistic request and diagnostic response, in response to diagnosing the failure.

6. The vehicle according to claim 5, further comprising:
an Ethernet diagnostic device connected to the Ethernet switch, configured to perform communication with the plurality of Ethernet controllers using the SOME/IP, and diagnose failures of the plurality of Ethernet controllers.

7. The vehicle according to claim 6, wherein the Ethernet switch is configured to register or remove the plurality of Ethernet controllers and the Ethernet diagnostic device from a member list by communicating with the plurality of Ethernet controllers and the Ethernet diagnostic device through an Internet group management protocol (IGMP).

8. The vehicle according to claim 5, further comprising:
a CAN diagnostic device configured to perform the CAN communication, and diagnose failures of the plurality of CAN controllers.

* * * * *